United States Patent
Hugl et al.

(10) Patent No.: US 9,072,060 B2
(45) Date of Patent: Jun. 30, 2015

(54) METHOD, APPARATUS AND COMPUTER PROGRAM FOR POWER CONTROL TO MITIGATE INTERFERENCE

(75) Inventors: Klaus Hugl, Helsinki (FI); Cassio Barboza Ribeiro, Espoo (FI); Klaus F. Doppler, Espoo (FI); Carl S. Wijting, Espoo (FI); Pekka Markus Nikolai Janis, Espoo (FI)

(73) Assignee: Nokia Technologies Oy, Espoo (FI)

( * ) Notice: Subject to any disclaimer, the term of this patent is extended or adjusted under 35 U.S.C. 154(b) by 357 days.

(21) Appl. No.: 12/455,644

(22) Filed: Jun. 3, 2009

(65) Prior Publication Data

US 2009/0325625 A1 Dec. 31, 2009

Related U.S. Application Data

(60) Provisional application No. 61/130,750, filed on Jun. 3, 2008.

(51) Int. Cl.
*H04B 7/00* (2006.01)
*H04W 52/24* (2009.01)
*H04W 52/16* (2009.01)
(Continued)

(52) U.S. Cl.
CPC ............ *H04W 52/244* (2013.01); *H04W 52/16* (2013.01); *H04W 52/146* (2013.01); *H04W 52/242* (2013.01); *H04W 52/367* (2013.01); *H04W 52/383* (2013.01); *H04W 52/386* (2013.01); *Y02B 60/50* (2013.01)

(58) Field of Classification Search
CPC . H04W 52/146; H04W 52/16; H04W 52/242; H04W 52/244; H04W 52/367; H04W 52/383; H04W 52/386
See application file for complete search history.

(56) References Cited

U.S. PATENT DOCUMENTS

2004/0017792 A1   1/2004  Khaleghi et al. .............. 370/335
2004/0043783 A1*  3/2004  Anderson ..................... 455/522
(Continued)

FOREIGN PATENT DOCUMENTS

EP      1608108 A      12/2005
WO      WO-01/62026 A   8/2001
(Continued)

OTHER PUBLICATIONS

International Search Report for corresponding International Patent Application No. PCT/IB2008/051920 mailed Feb. 26, 2009.
(Continued)

*Primary Examiner* — Fanghwa Wang
(74) *Attorney, Agent, or Firm* — Harrington & Smith

(57) ABSTRACT

A network determines that a first radio node communicating on a radio resource with a second radio node is interfering with a third radio node communicating on the radio resource with the network. The network manages the interference by controlling transmit power of at least one of the first radio node and the third radio node. It may be by sending a command that indicates an amount by which the first or second radio node is to decrease its transmit power; and/or that indicates an amount by which the third radio node is to boost its transmit power. The network can measure a sounding signal it triggers from the first radio node, measure and compare to a threshold that guarantees a QoS for the third radio node, and compute appropriate backoff or boost values. The first and second radio nodes may be using device-to-device communications or a femto network.

17 Claims, 6 Drawing Sheets

(51) Int. Cl.
*H04W 52/38* (2009.01)
*H04W 52/14* (2009.01)
*H04W 52/36* (2009.01)

(56) References Cited

U.S. PATENT DOCUMENTS

| | | | |
|---|---|---|---|
| 2004/0252666 A1* | 12/2004 | Johnson | 370/335 |
| 2005/0111383 A1* | 5/2005 | Grob et al. | 370/254 |
| 2005/0163070 A1* | 7/2005 | Farnham et al. | 370/328 |
| 2006/0280160 A1 | 12/2006 | Padovani et al. | 370/347 |
| 2007/0097962 A1* | 5/2007 | Yoon et al. | 370/352 |
| 2007/0104138 A1 | 5/2007 | Rudolf | |
| 2007/0189234 A1 | 8/2007 | Heo et al. | 370/335 |
| 2007/0230423 A1 | 10/2007 | Yoshida et al. | |
| 2007/0270151 A1* | 11/2007 | Claussen et al. | 455/444 |
| 2007/0298728 A1 | 12/2007 | Imamura et al. | 455/77 |
| 2008/0057934 A1 | 3/2008 | Sung et al. | 455/422.1 |
| 2008/0076433 A1* | 3/2008 | Cheng et al. | 455/442 |
| 2008/0253300 A1 | 10/2008 | Wakabayashi et al. | 370/252 |
| 2009/0010186 A1 | 1/2009 | Li et al. | 370/310 |
| 2009/0016278 A1 | 1/2009 | Wakabayashi | 370/329 |
| 2009/0046573 A1 | 2/2009 | Damnjanovic | 370/216 |
| 2009/0061886 A1 | 3/2009 | Cozzo et al. | 455/450 |
| 2009/0104912 A1* | 4/2009 | Foster et al. | 455/446 |
| 2009/0109907 A1 | 4/2009 | Tsai et al. | 370/329 |
| 2009/0253421 A1* | 10/2009 | Camp et al. | 455/418 |
| 2010/0029211 A1 | 2/2010 | Teague | 455/63.1 |
| 2010/0135238 A1 | 6/2010 | Sadri et al. | 370/329 |
| 2011/0002284 A1 | 1/2011 | Talwar et al. | 370/329 |
| 2011/0116410 A1 | 5/2011 | Sung et al. | 370/252 |

FOREIGN PATENT DOCUMENTS

| | | |
|---|---|---|
| WO | WO-2005/039105 A | 4/2005 |
| WO | WO-2007/082035 A2 | 7/2007 |
| WO | WO-2008/005922 A | 1/2008 |

OTHER PUBLICATIONS

Lei, et al.; *Interest-Based Peer-to-Peer Group Management*; Proceeding FMN '09 Proceedings of the 2nd International Workshop on Future Multimedia Networking; Springer-Verlag Berlin, Heidelberg © 2009; pp. 107-118.

Koivunen, et al.; *Interference-Aware Resource Allocation for Device-to-Device Radio Underlaying Cellular Networks*; Vehicular Technology Conference, 2009. VTC Spring 2009. IEEE 69$^{th}$ ; Apr. 26-29, 2009 (5 pages).

Doppler, et al.; *Innovative concepts in Peer-to-Peer and Network Coding*; Celtic Telecommunications Solutions Winner +; Wireless World Initiative New Radio—Winner +; http://projects.celtic-initiative.org/winner+/WINNER+%20Deliverables/D1.3_v1.pdf (25 pages).

802.15.1-2005—IEEE Standard for Information technology—Local and metropolitan area networks—Specific requirements—Part 15.1a: Wireless Medium Access Control (MAC) and Physical Layer (PHY) specifications for Wireless Personal Area Networks (WPAN) (1169 pages).

802.11-2007—IEEE Standard for Information Technology—Telecommunications and Information Exchange Systems—Local and Metropolitan Area Networks—Specific Requirements—Part 11: Wireless LAN Medium Access Control (MAC) and Physical Layer (PHY) Specifications (1232 pages).

80.16-2009—IEEE Standard for Local and Metropolitan Area Networks Part 16: Air Interface for Fixed and Mobile Broadband Wireless Access Systems (1080 pages).

J. Lehtomaki et al.; "Direct Communication Between Terminals in Infrastructure Based Networks"; ICT-Mobile Summit 2008 Conference Proceedings; 2008; whole document (8 pages); IIMC International Information Management Corporation.

* cited by examiner

| 602 | 604 | 606 | 608 | 610 | 612 |
|---|---|---|---|---|---|
| Header | UEID | Link ID | Profile_name | Freq_profile(f, bw) | Argument |

| 702 | 704 | 706 | 708 | 712 |
|---|---|---|---|---|
| Header | UEID | Link ID | Profile_name | Argument |

METHOD, APPARATUS AND COMPUTER PROGRAM FOR POWER CONTROL TO MITIGATE INTERFERENCE

CROSS REFERENCE TO RELATED APPLICATION

This application claims benefit under 35 USC 119(e) to Provisional U.S. Patent Application 61/130,750 (filed Jun. 3, 2008), the content of which are hereby incorporated by reference.

TECHNICAL FIELD

The teachings herein relate generally to interference mitigation through power control of communicating devices.

BACKGROUND

The following abbreviations and terms are herewith defined:
3GPP $3^{rd}$ generation partnership project
AP access point
BS base station (e.g., network access node, NodeB, eNodeB, etc.)
D2D device-to-device
IMT international mobile telecommunications
ITU international telecommunications union
LTE long term evolution of UTRAN (also known as 3.9G)
OFDM orthogonal frequency division multiplex
SIR signal-to-interference ratio
UE user equipment (e.g., mobile or subscriber station SS/MS, terminal)
UMTS universal mobile telecommunications system
UTRAN UMTS terrestrial radio access network
WiMAX worldwide interoperability for microwave access Currently the IMT-Advanced process tries to guide the development of future cellular wireless access in order to fit future user needs. IMT-Advanced include radio technologies that meet the requirements currently defined by ITU for radio technologies beyond IMT-2000 (year 2010 and beyond). 3GPP is currently defining a study item to prepare LTE-Advanced that meets the IMT-Advanced requirements. Competing technologies such as WiMAX are expected to define advanced versions of current standards to be IMT-Advanced technologies. For WiMAX, standardization of IMT-Advanced technology is currently taking place in the 802.16m task group.

Device-to-device D2D communication has been identified as one of the possible areas of study for future cellular enhancements leading to IMT-Advanced, in order to enable new type of services. D2D communication has been mentioned and discussed during the IMT-A workshop organized by 3GPP in Shenzhen, China, in April 2008, and suggested by Motorola to the 802.16m task group.

There are several standards that support D2D operation in the same broad frequency bandwidth as is used by the network access point, base station or central controller as the case may be. Some of these are detailed below with reference to FIG. 1a in which two portable wireless devices UE1 and UE2 are communicating with the network base station BS and with one another.

In the Hiperlan 2 (high performance radio local area network, similar to IEEE 802.11 system), UE1 sends a resource request (several OFDM symbols=slots) for direct communication with UE2 to the central controller/BS. After receiving a resource grant, UE1 transmits to UE2 in the granted slots within the direct link phase in the MAC (medium access control) frame. If UE2 wants to transmit to UE1 it has to reserve slots as well. An exception exists in acknowledged mode, where the central controller reserves also slots for the acknowledgements of the other UE, but still the central controller reserves the slots used in communications between UE1 and UE2. It is also possible for a UE to request a fixed slot allocation, i.e. selected slots are allocated to a UE for multiple frames instead of on an individual slot basis. Note that in Hiperlan 2, the allocation is always for a single UE and the central controller as well as any other UEs communicating directly with one another cannot transmit at the same time. This is not seen to be an efficient use of the available radio resources. Each UE has to reserve slots for each and every transmission which results in a high signaling load for requesting and allocating the slots. The number of direct links in the subnet is limited in the fixed slot allocation. Further, only full OFDM symbols can be reserved, which is too much for a system bandwidth of e.g. 100 MHz with 2048 subcarriers. For example, assuming 1600 usable subcarriers and 64QAM modulation, this equals to 8 kb for one OFDM symbol but for example a TCP/IP acknowledgement packet has only a size of 320b. So in Hiperlan 2, if one OFDM symbol is reserved for direct communications between UE1 and UE2, then no other UE in the same subnet (under the same BS) is able to communicate using the same OFDM symbol. While this restriction ensures that there is no interference from another node in the subnet, it is not seen as the best use of scarce radio resources.

In the Tetra system (terrestrial trunked radio, designed for use by government agencies and emergency services), several frequency channels are reserved purely for device to device communication. However this system uses a fixed allocation of channels for D2D communications, which reduces the amount of resources available for the BS-UE links.

In the WLAN system, UE1 senses the medium and if it is free, it transmits. But there is no control by the network over the D2D links and so as spectrum becomes more crowded there will be insufficient free medium for D2D communications.

In the WiMAX system, there is a recent proposal of Motorola in the 802.16m study group to reserve a zone (several full OFDM symbols) for D2D communication. Similar to Hiperlan 2, only full OFDM symbols can be reserved which as noted above and by example is too much for a system bandwidth of e.g. 100 MHz with 2048 subcarriers.

As can be seen from the above review, a common assumption in those existing systems is that the D2D communications occur in frequency and/or time resources that are separated from those in use by the network (BS) directly. However IMT-A anticipates that D2D communication will share the same band that the cellular network is using, and hence it is needed to coordinate the D2D communication with the cellular network to be able to offer guaranteed service levels to the users in the cellular network. What is needed is a way to enable D2D communications in a manner that does not unnecessarily limit radio resource available to the network and that allows the network to fulfill its minimum requirements as to channel quality (quality of service QoS; error rate, etc.).

SUMMARY

In accordance with an exemplary aspect of the invention there is a method comprising: determining at a network that a first radio node communicating on a radio resource with a second radio node is interfering with a third radio node communicating on the radio resource with the network; and managing the interference by controlling transmit power of at least one of the first radio node and the third radio node. In a particular embodiment, such a method may be the actions performed by a device such as an access node of the network (or one or more components thereof) which are directed by a computer program stored on a computer readable memory and executed by a processor.

In accordance with another exemplary aspect of the invention there is an apparatus which comprises a processor and a transmitter. The processor is configured to determine that a first radio node communicating on a radio resource with a second radio node is interfering with a third radio node communicating on the radio resource with a network in which the apparatus lies. The transmitter is configured to manage the interference by controlling transmit power of at least one of the first radio node and the third radio node. In an embodiment, such an apparatus is an access node of the network, or one or more components thereof.

In accordance with another exemplary aspect of the invention there is a method which comprises: a first device communicating with a second device over an underlay network link; receiving at the first device from a macro network a power indication that comprises a backoff command that manages interference between the underlay network link and a different link to the macro network; and the first device adjusting its power for transmissions over the underlay network link according to the backoff command. In an embodiment, such a method is executed by the first device or one or more components thereof, which by example is a user equipment or a base station of a femto network.

These and other more particular aspects are detailed below with particularity.

BRIEF DESCRIPTION OF THE DRAWINGS

The foregoing and other aspects of these teachings are made more evident in the following Detailed Description, when read in conjunction with the attached Drawing Figures.

FIG. 1b is an overview of how the power control aspects of these teachings overlay FIG. 1a.

DETAILED DESCRIPTION

Embodiments of this invention provide a novel power control scheme to facilitate operation of device-to-device communication on the same radio resources being used by the network cell in which the D2D devices operate. The devices are termed generally as terminals or user equipment UE (e.g., mobile stations MS, subscriber stations SS, etc.). As will be seen, this approach enables power control of the D2D communications such that the D2D transmissions can share the same resources as the cellular network, while maintaining the quality of service of the cellular network.

As detailed below, these teachings are also applicable to overlay networks, in which there is a wireless network within another broader wireless network such as for example a femto network operating within a broader cellular or macro network. In those embodiments, communications between the femto base station and the femto-serviced terminal/user equipment are in the position of the D2D devices UE1 and UE2. The femto network and the terminals communicating in the D2D link can be considered to be underlay networks since they form communication networks within the over-arching macro network. To more clearly describe the invention by way of example, the D2D implementation is first described.

Figure 1A:
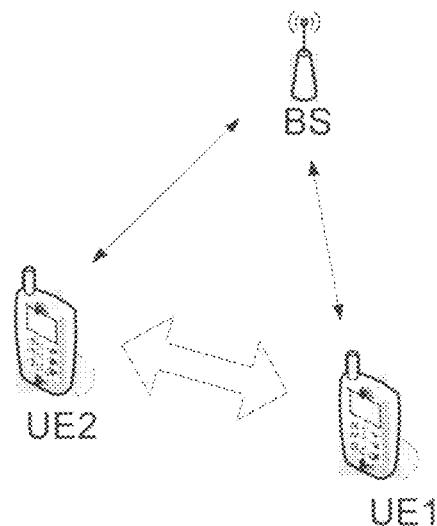
FIG. 1a is a prior art block diagram showing two devices in communication with a network base station and with one another (D2D), and is used with reference to a description of prior art approaches.
Figure 1B:
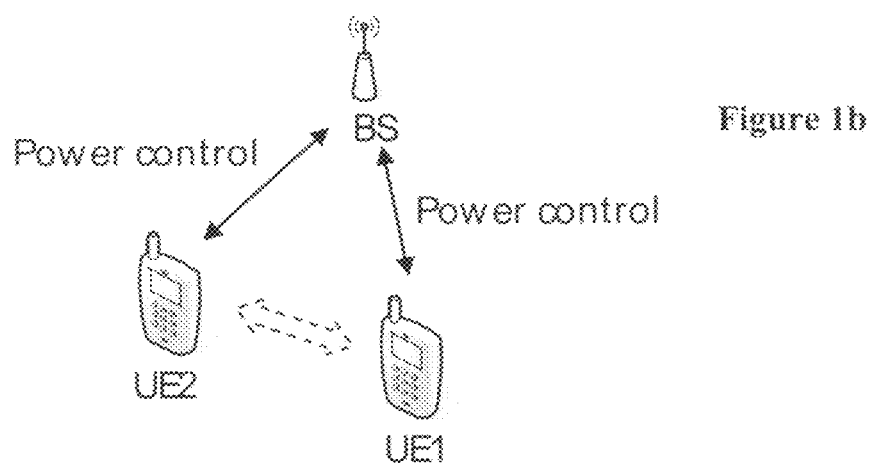

With reference to FIG. 1b, a first device UE1 is communicating on a radio resource with a second device UE2, but those D2D communications are interfering with network communications with some other third device (shown at FIG. 4) communicating on the same radio resource. This interference is managed by the network controlling transmit power of any or all of the first device, the second device, and the third device. The network sets up the D2D communications link (e.g., upon request of the UEs engaging in it) and can predict the level of interference and signal power controls as detailed below in order to keep that interference at an acceptable level. There is still interference, but it is managed by the network so as not to adversely affect the UE-BS communications ongoing in the network.

As will be detailed, the network controls transmit power of UE1 and/or UE2 (whichever has the interfering transmissions) by including power backoff in the power control command indicating how much to reduce transmit power in their D2D link, and may also control transmit power of the third device UE3 by including power boosting in the power control command indicating how much to increase its transmit power on its UE-BS link. The network is able to quantify the amount of the power backoff or boost despite the fact that it has no knowledge of the quality of the D2D link between UE1 and UE2. The interference is allowed to continue, but is limited by the network's power control over the device(s) so as to assure the network can maintain its quality of service. It is therefore an interference mitigation approach rather than eliminating interference by frequency/time separation as in the systems described in background above. This mitigation enables sharing of the same radio resources (e.g., time and frequency resources, spreading codes, etc.) between D2D and cellular so as to avoid an unacceptable performance degradation, particularly in the cellular link between the BS and UE3 using those radio resources. In the below description and the overview above, there is assumed a third device UE3 whose UL transmissions to the BS 200 are interfered by the D2D communications.

The power backoff and power boost commands form a part of the BS's overall power control of the UE's transmit power. Thus the actual value of the 'backoff' or 'boost' as detailed herein need not be signaled itself, but the overall power control that the BS imposes on the UE takes into account the backoff and/or boost values that are detailed herein. Thus in certain specific implementations the actual value of the backoff or boost may be transparent to the UE which simply implements the power control commanded by the BS as normal. In such implementations the BS may actively employ the backoff and/or boost values such as those detailed herein to settle on the power command it sends to the UE, but the UE may not be aware that such a boost/backoff value was used in determining the value of the power command it eventually receives. In other embodiments the backoff or boost value may be directly signaled in which case the UE can be aware of its actual value.

The following description of exemplary and non-limiting embodiments is in the context of IMT-A and uses terms associated with that system, but as noted above the invention is not limited only to that system and terms used below are readily interchangeable with different terms representing similar functioning nodes of other wireless access systems without departing from the broader aspects of these teachings (base station of cellular networks represents access node for example in WLAN, cellular network represents for example WLAN network, etc.). The term network excludes user equipment (except to the limited extent a UE is employed as a relay node for the network), and devices engaged in D2D communications may also be in simultaneous communication with the network. The particular exemplary embodiments of the invention that are detailed below with respect to D2D communications proceed from the following assumptions:

UE1 and/or UE2 are associated with the BS/network;

The quality of the link between UE1 and UE2 is good enough in order to facilitate feasible, reliable direct D2D communication without causing excessive interference towards the BS/network and D2D transmissions share the same resources as the uplink (UL) transmissions of the cellular network.

According to an exemplary embodiment of the invention there is a mechanism for determination of the maximum power level of D2D transmissions of each terminal that allows for simultaneous uplink operation of the cellular network and D2D communications using the same resources. The maximum power level of D2D transmissions is determined such that interference to the cellular network is small enough in order not to disturb the cellular UL communication.

Another assumption is that the terminals interested in establishing a D2D link are connected to the BS and hence the BS is able to compute the power which would be required for a regular uplink (UL) transmission. In a cellular network the power control is often defined such that the power spectral density received by the BS from any terminal is approximately the same (e.g., within a limited/predefined dynamic range), regardless of its relative position to the BS. Another possible power control target in wireless communication networks is to achieve a certain signal to interference ratio or link quality in the sense of, e.g. frame error rate, block error rates etc. FIG. 1b illustrates this concept, where the BS is able to apply power control on the link between the UEs and the BS itself, but it does not necessarily know the quality of the link between UE1 and UE2. It is noted that the power control of FIG. 1b is for the D2D link, unlike known spread spectrum systems where open loop power control adjustments are for the link between the UE and the network. It is noted that the network may also engage in such known power control over its communication links with UEs, whether or not those UEs are engaged in D2D communications. But such network-link power control would be additional to the power control over the D2D link(s) detailed herein.

Figure 2:
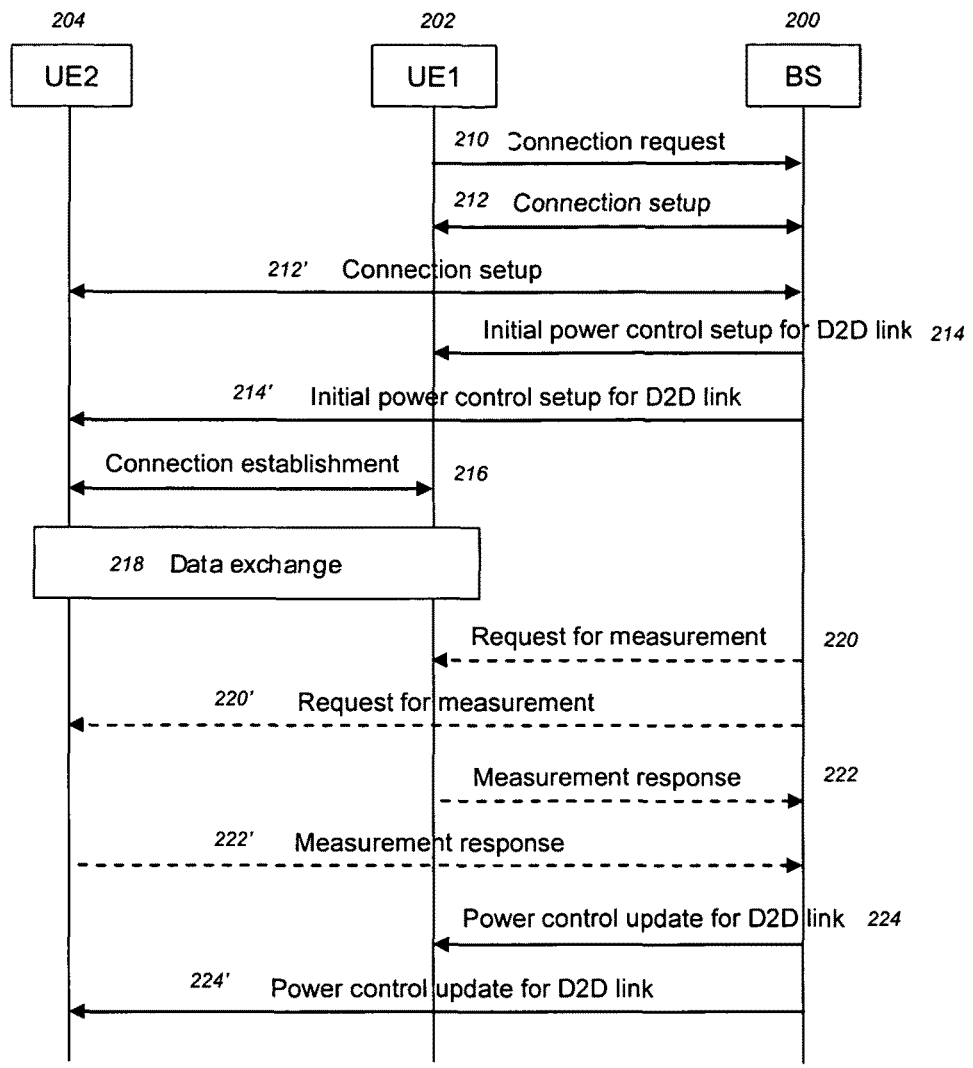
FIG. 2 is a signaling diagram showing a power control procedure for the D2D link based on uplink power control with backoff according to an exemplary embodiment of the invention.

The D2D power control procedure is illustrated in FIG. 2, where UE1 202 sends a D2D connection request 210 for the D2D connection to the BS 200. The details on connection setup, including authentication and bearer establishment are not shown in FIG. 2 but may follow standard procedures in use for the relevant network/wireless system. Once the BS is connected to both UEs that will be engaged in the D2D connection, the BS 200 responds with a connection setup message 212, 212' to the respective first UE (UE1) 202 and second UE (UE2) 204 giving the radio resources allocated for that D2D link. The BS 200 also (either separately from as shown in FIG. 2 or alternatively with the connection setup messages 212, 212') sends initial power control information 214, 214' as the maximum allowed transmission power for the D2D link between the first UE 202 and the second UE 204. Note that BS does not have any information about the D2D link between UE1 and UE2. The initial power control commands sent by the BS for the D2D link take into account interference the UEs (on the UE-UE link) would cause to the cellular network's links (e.g., UE-BS) and keep the interference caused by the UEs below a target set by the BS. This initial power control command setting could be therefore proportional to the uplink transmission power the UE uses when communicating with the BS/network. One exemplary approach to the initial D2D link power control setup command 214, 214' is detailed below with reference to FIG. 5. At this point the initial power commands 212, 212' for the D2D link may be estimated by the BS 200 based on the power it commands for the first 202 and second 204 UE to use on their regular UL (non D2D) links to the BS 200, based on measurements performed at the BS 200 (e.g., soundings) or else based on measurement reports already received from the UEs. The UEs 202, 204 then setup their mutual D2D connection 216 and exchange data 218 with one another over the D2D connection without using the BS 200 as an intermediary. After the connection has been established, power control commands should be sent periodically from the BS to the first UE 202 and to the second UE 204 in order to take into account channel variations and mobility of the terminals. The initial power control setup messages 214, 214' should provide the cell specific configuration for power control, while the power control update messages 224, 224' are shorter messages that only update the power levels due to mobility of terminals and channel variations in general. These messages are detailed further below, including example signaling formats at FIGS. 6-7. The BS 200 can send the power control commands 214, 214', 224, 224' based on available measurements (e.g., those obtained from periodic transmissions from the UE to BS 200), or else the BS 200 can request updated measurements from the UE. In the latter case the UE can send sounding signals that allows BS 200 to determine the appropriate power control commands. The BS 200 can request such measurements, e.g. when it determines that interference exceeds a threshold or else if interference is below another threshold, indicating that higher transmit power could be allowed in the D2D transmissions. This is not to say that the threshold is the same as would be required for the BS to meet its quality targets on the BS-UE links; in exemplary embodiments the interference is managed so as not to exceed those mandated quality targets and so the threshold of acceptable interference may be set with some margin to guarantee the minimum channel quality on the BS-UE links.

Respecting the optional request for measurements, these are shown by example at FIG. 2 as a measurement trigger message 220, 220' to the first 202 and second 204 UE, and their respective responses to the measurement trigger messages, which can consist of sounding signals that allows BS 200 to directly measure the UE-BS links. In another embodiment, the messages 220, 200' request measurements that are performed at the first 202 and the second 204 UE, and their respective measurement response messages 222, 222' are sent to the BS 200. Since interference will be different at the BS as compared to at the UE making such a measurement report, the UE's explicit measurement report need only include measured signal power and/or pathloss. In still another embodiment the BS 200 need not direct the UEs 202, 204 to transmit sounding signals or measurement reports, but the BS itself simply measures their normal UE-BS transmissions.

Consider as an example that the D2D transmission of UE1 shares the same resources as the UL transmission of UE3 to the cellular network. Define $P_1$ as the power of the UE1 D2D transmission, and $P_c$ as the power of the UE3 UL cellular transmission. Define also $L_1$ and $L_c$, which account for all losses in the link connecting UE1 and UE3, respectively, to the BS. The received signal at the BS for one OFDM symbol and one subcarrier can then be written as $$y = \sqrt{\frac{P_c}{L_c}} x_c + \sqrt{\frac{P_1}{L_1}} x_1 + n, \quad [1]$$

where $x_c$ and $x_1$ are the symbols transmitted by UE3 and UE1, respectively, and n represents an interference term that accounts for all other sources of interference, including noise.

Further assume that the UE transmission TX power control is defined such that the signals transmitted from all terminals in the cellular network arrive at the BS with a target power P. This implies $P=P_c/L_c$, i.e. $P_c=PL_c$. So now define a backoff $B_1$ such that the interference power received at the BS from a D2D transmission of UE1 is equal to $P/B_1$. Hence the D2D transmit power $P_1$ by UE1 is given by:

$$P_1 = \frac{PL_1}{B_1}. \quad [2]$$

With these definitions the received signal, y, may be re-written as $$y = \sqrt{P} x_c + \sqrt{\frac{P}{B_1}} x_1 + n. \quad [3]$$

Assuming Var($x_c$)=Var($x_1$)=1 (where Var( ) denotes the variance) and that the transmitted symbols and interference plus noise n are uncorrelated, the signal-to-interference-plus-noise ratio (SINR) of the UL reception of UE3 is given by:

$$SINR_c = \frac{P}{\frac{P}{B_1} + \sigma_n^2}, \quad [4]$$

where $\sigma_n^2$ is the variance of the interference term n. It is clear from equation [4] above that if $P/B_1 \ll \sigma_n^2$ the impact of the D2D transmission on the cellular network traffic is negligible. This fact may be used as a restriction in order to allow D2D communication over a same radio resource as in simultaneous use between UE3 and the BS without serious interference to the BS, even close to the BS. The BS has full control over the amount of produced UL interference by any D2D communication it is willing to tolerate by choosing the backoff factor $B_1$ properly and signalling an indication of that backoff to the UE using the D2D link for setting its transmit power for that D2D link. Clearly the transmit power limitation in the D2D communication will reduce its possible range. Note that the BS may signal the backoff factor directly, or signal a normal power control which the BS determines at least in part from the backoff factor.

Figure 3:
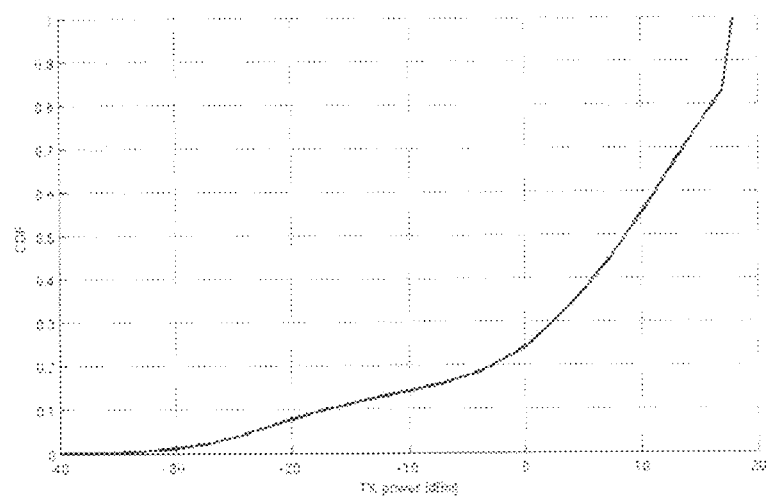
FIG. 3 is a graph of cumulative distribution function of the terminal transmit power in the uplink.

There may be some instances where the 'regular' backoff such as that determined by the above equations is too great a reduction for the D2D communication to remain effective. Said another way, assume a D2D terminal would need a slightly higher transmit power for a successful D2D communication than the BS would assign using the regular backoff from its UL transmission power. In such cases the BS 200 can reduce or eliminate the backoff of the D2D terminal 202, 204 as would be computed above by increasing the transmit power of the terminal UE3 that transmits on the same resources in uplink to the BS 200. Since the maximum interference caused by the D2D terminal is known, the BS can command UE3 to increase the power of its own transmission in order compensate for the extra interference term. This can be part of e.g. signal quality based UL power control. FIG. 3 is a graph showing one example of transmit power distribution for terminals connected to the cellular network in a typical indoor environment. The vertical axis is cumulative distribution function CDF and the horizontal axis is transmitter power in the uplink (where 18 dBm is the maximum transmit power). That graph makes clear that in approximately 80% of the cases, the terminals are not using maximum transmit power, and hence it is possible to increase the transmit power in order to compensate for D2D interference.

Now denote by $P_c^1 = P_c \alpha$ the transmitted power of UE3 in the cellular network, where $\alpha$ is the power boosting term. The SINR of the received signal is then given by $$SINR'_c = \frac{P\alpha}{\frac{P}{B_1} + \sigma_n^2}. \quad [5]$$

The power boosting $\alpha$ is defined such that the resulting SINR is equal to the target signal-to-noise ratio (SNR) determined by the power control. Hence, $\alpha$ can be obtained as $$\frac{P\alpha}{\frac{P}{B_1} + \sigma_n^2} = \frac{P}{\sigma_n^2} \Rightarrow \alpha = \frac{1}{B_1} \cdot \frac{P}{\sigma_n^2} + 1. \quad [6]$$

The power boosting gives another level of flexibility for controlling interference through power adjustments, since it is possible to tradeoff between backoff and power boosting values. For example, terminals engaged in D2D communications near the BS can be allowed a smaller backoff, which is compensated for by assigning power boosting to those terminals in the cellular network that are sharing the same resources. On the other hand, terminals engaged in D2D communications at the cell edge can afford higher backoff values, thus there will be no need for power boosting for the corresponding terminals in the cellular network sharing the resources with D2D communication at the cell edge. In both instances, the term a can be used in order to guarantee a minimum quality on the BS-UE link despite interference from the D2D ongoing link. As with power backoff, the BS can simply incorporate the power boosting value into the power control that it normally sends to UE3.

Figure 4:
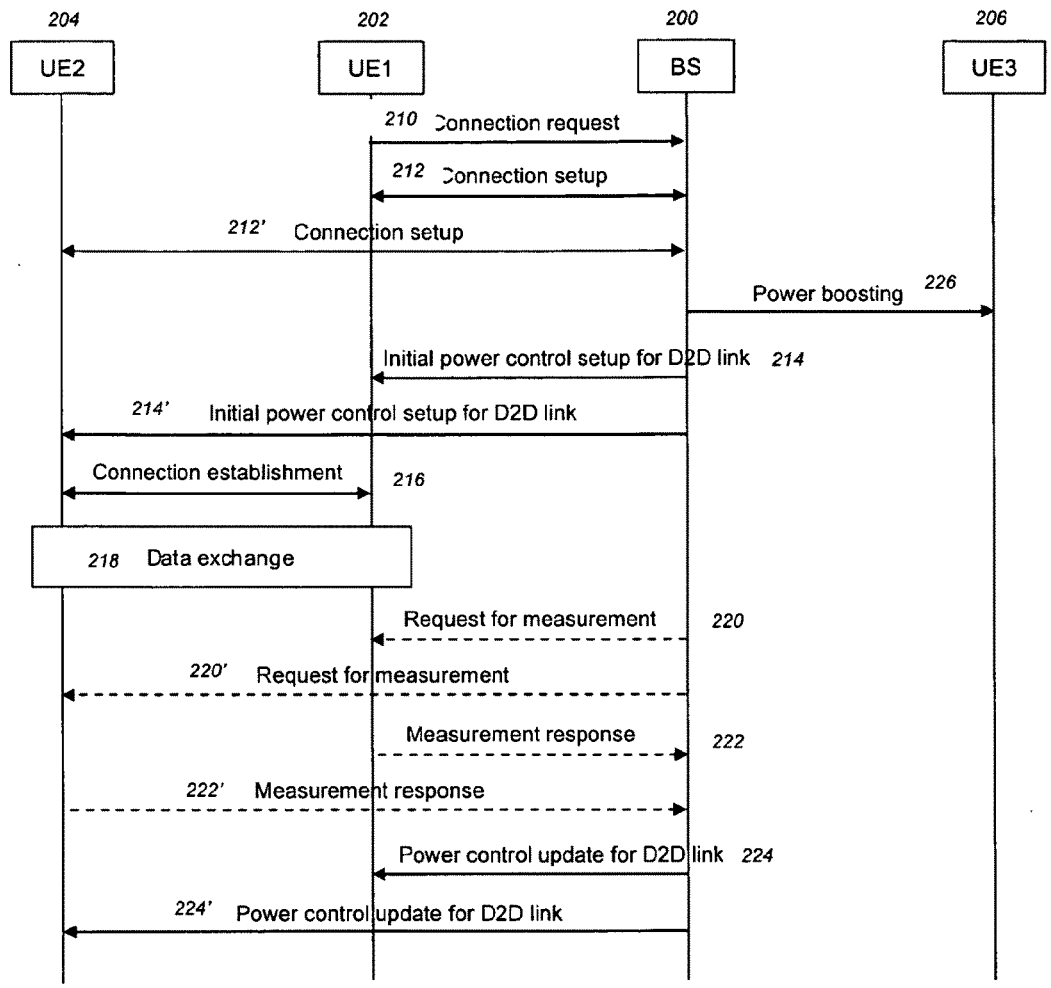
FIG. 4 is a signaling diagram similar to FIG. 2 but also showing power boosting according to another exemplary embodiment of the invention.

FIG. 4 is a signaling diagram like FIG. 2 but further illustrating the power control procedure with power boosting. Like reference numbers refer to like messages from FIG. 2. A third UE 206 (UE3) is connected to the cellular network/BS 200 using the same resources as UE1 and UE2 are using on the D2D link, and it receives a power boosting command 226 once a D2D connection is established 216 between the first UE 202 and the second UE 204. Power boosting is not required for other UEs in the cellular network that are not sharing resources with an interfering D2D connection between the first UE 202 and second UE 204. After the D2D connection has been established 216, power control update commands 224, 224' should be sent periodically from the BS 200 to the first UE 202 and to the second UE 204 in order to take into account channel variations and mobility of the terminals. The UL power control and the power boosting values to UE 206 (UE3) as well as the UL power control and the backoff value for UE 202 and UE 204 need to be kept up to date. The power boosting value does not need to be updated frequently, since the actual power boosting is dependent only on the backoff and SNR target for power control. Hence, the power boosting should generally be updated only if the BS 200 modifies the backoff applied to D2D transmissions 218 or the target SNR for power control. When the D2D connection between the first UE 202 and the second UE 204 is closed, the BS 200 signals the third UE 206 to stop applying the power boosting. The backoff and the power boosting values can be signaled explicitly as illustrated here or else they can be signaled implicitly by normal power up and power down commands. It should be noted that in case the UL power control and power boosting values to UE 206 are signaled implicitly by normal power control commands, the power control can be too slow to adjust to the possible situations that may arise, for example when starting or stopping application of power boosting.

Figure 5:
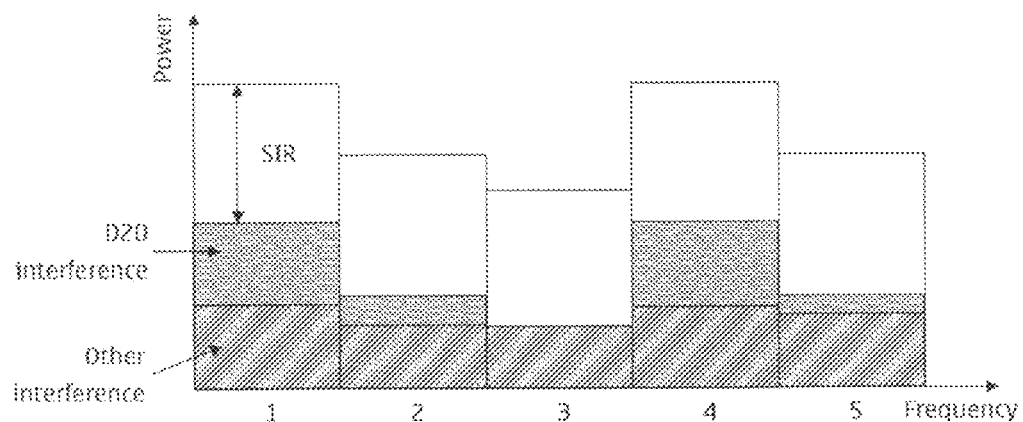
FIG. 5 is a graph showing power spectrum density of the signal arriving at the BS from different UEs in uplink communication versus frequency and illustrating the concept of zones with different power boosting according to another exemplary embodiment of the invention.

The BS 200 can also coordinate allocations such that D2D communications by terminals close to the BS 200 occupy resources that are assigned to terminals in the cellular network that have enough margin for power boosting. One possibility is that the BS assigns different bandwidth regions for different combinations of power boosting/backoff. This concept is illustrated in FIG. 5, which shows the power spectrum density of the received signal at the BS 200. Shown by example are five frequency regions (bands) for different boost/backoff combinations, together with the corresponding D2D interference and other sources of interference, as well as the signal-to-interference ratio (SIR) in each case. In this example regions 501 and 504 use higher power boosting and hence can tolerate higher interference, which makes them suitable for D2D communications with small backoff values. Region 503, on the other hand, does not allow power boosting, and in order to meet the SIR target D2D operation is not allowed in this region. Regions 502 and 505 lie between those other extremes, and exhibit tolerance to a relatively small amount of interference from D2D transmissions, and hence D2D communications should be restricted in these regions to D2D terminals that can afford large backoff values for operation. The exact backoff values in each of the regions 502 and 505 can be different due to the overall interference condition. These different combinations of power boosting/backoff values can in some cases translate into preferable locations for D2D terminals inside the area covered by the BS 200. For example, in case of power control based on pathloss, terminals at the cell edge typically can operate with relatively high backoff values, while terminals close to the BS 200 might require relatively small backoff values for operation. These relations might not apply in case of power control based on, e.g. signal-to-interference-plus-noise ratio (SINR), or other measures. It should be noted, however, that the interference mitigation techniques detailed herein can be employed with any power control definition.

If the concept illustrated in FIG. 5 is applied, then the power control messages for the D2D link can be defined such that the "initial power control setup" message 214, 214' defines the backoff values to be applied in different frequency regions, while the "power control update" messages 224, 224' would specify only the correction values to be applied such that the SNR targets are reached in each frequency region 501-505. The latter messages would be shorter, implying reduced signaling overhead.

It is assumed that the UEs are communicating with the BS 200, and hence power control is needed in this UL connection to the BS as well. However, by defining separate configuration messages for initial power control setup 214, 214' and power control updates 224, 224' it is not needed to have separate power control commands for the D2D links and for the UE-BS links. This is due to the fact that the UEs are able to apply the backoff values in the D2D link, while transmitting with normal power when communicating with the BS. The commands for initial power control setup and for power control updates can be added into the power commands for the UE-BS link that the BS already sends according to many prior art protocols. This avoids increasing control signaling overhead due to D2D transmission.

An exemplary format of the initial power control configuration message for D2D link is given in FIG. 6, where the fields are defined as follows:

Header 602: message header, including message identification.

UE ID 604: identification of the UE to whom the message is addressed.

Link ID 606: identification of the D2D link. If this identification is not known, the ID of the other UE can be used as well.

Profile_name 608: identification of the frequency profile that will be used for the D2D connection.

Freq_profile(f, bw) 610: specification of the frequency profile. Identifies frequency zones and the respective bandwidths.

Argument 612: vector of values with maximum power levels and backoff values that should be applied in each zone.

Figures 6, 7, 8:
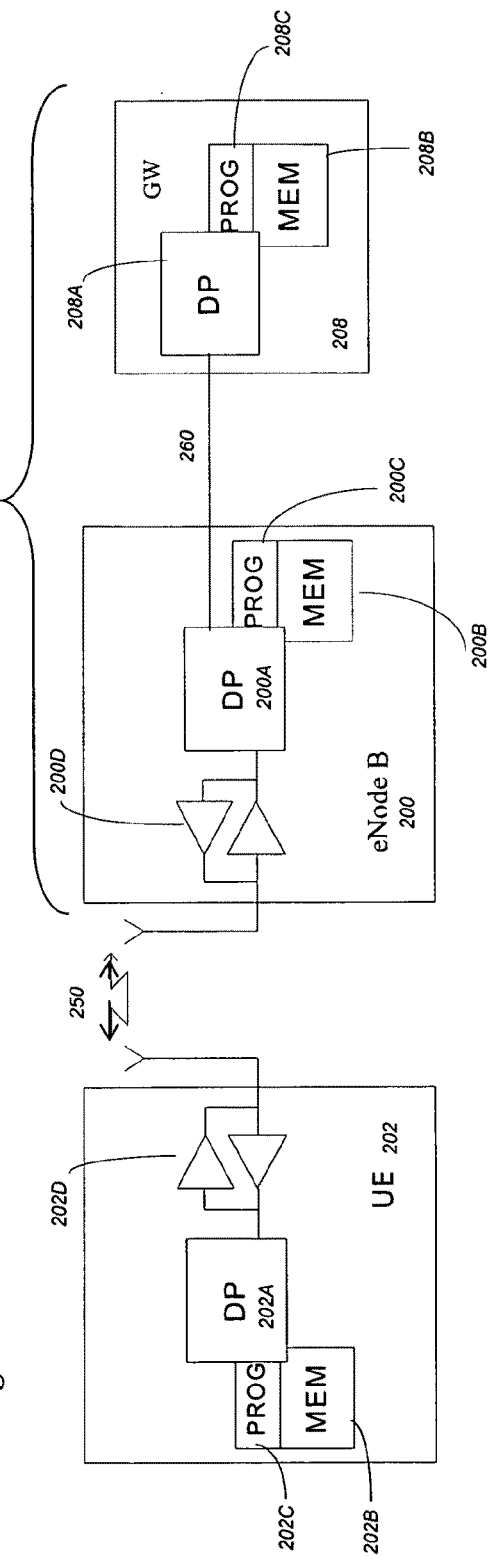
FIG. 6 is a schematic diagram of an initial power control configuration message according to an exemplary embodiment of the invention.
FIG. 7 is a schematic diagram of a power control update message according to an exemplary embodiment of the invention.
FIG. 8 shows a simplified block diagram of various electronic devices that are suitable for use in practicing the exemplary embodiments of this invention.

An exemplary specification of the initial power control configuration message for D2D link is given in FIG. 7, where like field names imply like content, and where:

Header 702: message header, including message identification.

UE ID 704: identification of the UE to whom the message is addressed.

Link ID 706: identification of the D2D link. If this identification is not known, the ID of the other UE can be used as well.

Profile_name 708: identification of the frequency profile that will be used for the D2D connection.

Argument 712: vector of values with power offset values that should be applied in each zone. Optionally one power offset can be applied for the whole bandwidth.

The above exemplary embodiments illustrate specific implementations of the invention. Further variations which may be applied individually or in any of various combinations include the following:

The backoff factor can be assigned semi-statically or it can be assigned to each terminal after a connection request. This would allow, e.g. assigning different thresholds for terminals close to the BS and for those near the cell-edge.

The BS can specify the backoff factor depending on quality of service of the cellular traffic (UE3) that is sharing the same resources.

The BS can specify the backoff factor depending on the power boosting allowed (not necessarily applied) for the terminal (UE3) in the cellular network that is sharing the same resources.

The BS can specify bandwidth zones where different levels of power boosting are allowed, and the D2D communications can be distributed accordingly, with the corresponding backoff values (see FIG. 5).

The different bandwidth zones can be used in combination with Flexible Spectrum Usage (FSU) techniques as well (FSU techniques or other network operational states might provide additional power constraints on some radio resources that have to be taken into account when sending the power control messages).

Terminals engaged in D2D communications (UE1 and UE2) can use the maximum power allowed by the BS or they can negotiate lower power levels with one another for the D2D link, in order to save battery power.

The BS can send initial power control targets for different bandwidth zones and backoff values, and send only up/down power control signals (e.g., one bit) to the UEs for the D2D transmit power adjustments once the connection is already established.

It is noted that though the above exemplary embodiments assume both UE1 and UE2 having the D2D link are associated with the same BS, they can also be associated with different BSs, each receiving its D2D transmit power control commands and other control information from their respective different BS. Secondly only one of the UEs can be associated with a BS and the other one is for example out of coverage. In this case the power control only applies to the UE that is associated with the BS.

More than two UEs could be engaged in a D2D communication and all of them can receive power control commands from the BS with which they are associated.

Particular advantages of exemplary ones of the embodiments above are that it is possible to have coexistence between D2D communication and cellular traffic using shared resources. Further, system capacity is increased since the D2D communication does not take resources from the cellular network but rather shares them. The impact on cellular traffic due to interference from D2D communication is controlled by the BS, enabling the BS to meet its quality minimums on the regular cellular traffic channels since interference by the D2D links are controlled to maintain those quality minimums (SINR, etc.). While there is still some non-zero interference to the cellular traffic which might reduce link throughout, these embodiments are seen as a more appropriate tradeoff than the prior art approaches summarized above because they do not take resources from the cellular network. Where the power boosting aspects are implemented, there may be a higher energy consumption for the boosted terminal(s) but the advantage is that the D2D communication is allowed to continue, which is not an option in the circumstances where backoff is the only option to assure interference is below the threshold.

Reference is now made to FIG. 8 for illustrating a simplified block diagram of various electronic devices that are suitable for use in practicing the exemplary embodiments of this invention. In FIG. 8 a wireless network 100 is adapted for communication between a UE 202 and an access node 200 (base station). The network may include a gateway GW/serving mobility entity MME/radio network controller RNC 208 or other radio controller function (not shown) known by various terms in different wireless communication systems. The UE 202 includes a data processor (DP) 202A, a memory (MEM) 202B that stores a program (PROG) 202C, and a suitable radio frequency (RF) transceiver 202D coupled to one or more antennas 202E (one shown) for bidirectional wireless communications over one or more wireless links 250 with the BS 200. The UE 202 may have simultaneous communication over the D2D link with the other UE, and the BS 200. The simultaneous communication can take place on separate resources, e.g. different frequency blocks or using the same resources utilizing further transceivers and/or antennas. Each of the links can have different or even independent maximum transmit power set by the power control. In one embodiment the UE adjusts the maximum transmit power on the link to the BS based on the UL power control commands and reduce the maximum transmit power on the D2D link by the backoff value. If the backoff value is signaled explicitly to the UE, the same power control commands can be used to adjust the transmit power for the link to the BS and for the D2D link. If the backoff value is signaled implicitly in the power control commands, separate power control commands are needed for each link. The second UE 204 as well as the third UE 206 are similarly configured as is shown at FIG. 8 for the first UE 202.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The BS 200 also includes a DP 200A, a MEM 200B, that stores a PROG 200C, and a suitable RF transceiver 200D coupled to one or more antennas 200E. The BS 200 may be coupled via a data path 260 (wired or wireless) to the Internet, a mobile switching center, or other broader network, which may be via a serving or other GW/MME/RNC 208. If present, the GW/MME/RNC also includes a DP 208A, a MEM 208B that stores a PROG 208C, and a suitable modem and/or transceiver (not shown) for communication with the BS 200 over the data link 260.

At least one of the PROGs 200C and 202C is assumed to include program instructions that, when executed by the associated DP, enable the electronic device to operate in accordance with the exemplary embodiments of this invention, as detailed above. Inherent in the DPs 200A and 202A is a clock to enable synchronism among the various apparatus for transmissions and receptions within the appropriate time intervals and slots required.

The PROGs 200C and 202C may be embodied in software, firmware and/or hardware, as is appropriate. In general, the exemplary embodiments of this invention may be implemented by computer software stored in the MEM 200B and executable by the DP 200A of the BS 200 and similar for the other MEM 202B and DP 202A of the UE 202 (and the other UEs 204, 206 detailed above), or by hardware, or by a combination of software and/or firmware and hardware in any or all of the devices shown.

In general, the various embodiments of the UE 202, 204, 206 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 200B and 202B may be of any type suitable to the local technical environment and may be implemented using any suitable data storage technology, such as semiconductor-based memory devices, magnetic memory devices and systems, optical memory devices and systems, fixed memory and removable memory. The DPs 200A and 202A may be of any type suitable to the local technical environment, and may include one or more of general purpose computers, special purpose computers, microprocessors, digital signal processors (DSPs) and processors based on a multi-core processor architecture, as non-limiting examples.

From the above description it is apparent that embodiments of this invention include a device such as an access node (e.g., a base station, a relay station, a NodeB, an eNodeB, a wireless access point, etc.), a computer program embodied on a memory that may be disposed in the access node, and a method by which the access node determines that a first terminal communicating on a radio resource with a second terminal is interfering with a third terminal communicating on the radio resource with a network, and managing the interference by controlling transmit power of at least one of the first terminal and the third terminal. Controlling the transmit power can be done by a power control command that implicitly includes the described backoff or boost values, or the power control command can explicitly include the backoff or boost values themselves (e.g., an indicator of those values).

Note that the interference is not fully eliminated but managed. The access node can measure the interference, compare the measured interference to a threshold that guarantees a quality target for the BS-UE link (e.g., maximum bit error rate BER/block error rate BLER/SNR/SINR on the BS-UE link with the third terminal that the BS must maintain), and send a power control command that includes the backoff and/or boost computations/values as detailed above to assure the quality target is maintained. In a particular example and as detailed above, determining that the first terminal is interfering with the third terminal is done by determining that a quality parameter (e.g., SINR, equation [4]) for a signal that is received from the third terminal and that is interfered by a signal received from the first terminal exceeds a threshold, wherein the signal received from the first terminal is a transmission over a D2D link to the second terminal. In one aspect where such a quality parameter is used, the interference is managed by sending a transmit power backoff indication to the first terminal for its transmissions over the D2D link. In another aspect where that same or similar such quality parameter is used, the interference is managed by sending a transmit power boost indication to the third terminal for its transmissions to the network. Both these options can be used also in combination with one another, and these indications need not be the values themselves but rather power control commands that incorporate the backoff and boost values. In another specific embodiment, an allocation of the radio resources to the first terminal for use in D2D communications with the second terminal inherently indicate an initial power backoff for the D2D transmissions by the first terminal (see FIG. 5). In further embodiments the BS triggers measurements (soundings or reports) periodically or when it determines that the interference is approaching a threshold. In one example the interference is approaching the threshold from below and is still at an acceptable level, and the periodic measurements are used to assure the interference does not exceed the threshold (or not exceed it too greatly). In another example the interference exceeds the threshold but is approaching it from above, which the BS can use to more gently control power among the first and/or third terminals with confidence that a new measurement will soon be available. This enables the BS to better avoid rendering the D2D link unusable due to aggressive power backoff to the first terminal that may not be needed when interference minimally exceeds the threshold and is falling. The BS is able to estimate the proper transmit power from the first terminal's transmission to the BS, and sends a power control update message to the first terminal to control the first terminal's transmissions on the D2D link. In another embodiment the initial power control message and the power control update message have the format shown at FIGS. 6-7 respectively, in which they differ at least in that the initial message has a frequency profile field lacking from the update message.

From the perspective of the terminal communicating on the D2D link, embodiments of the invention include a device such as a user equipment, a computer program embodied on a memory that may be disposed in the user equipment, and a method by which the user equipment is allocated a radio resource for a D2D communication, communicates with another terminal using the allocated resource and also communicates with a network that allocated the radio resource, receives a power indication from the network that includes a backoff command (implicitly or explicitly) that manages interference between the D2D communication and a different link to the network, and adjusts its power for transmissions over the allocated resource to the another terminal according to the power backoff indication.

In particular embodiments as detailed above, the terminal device may set an initial transmission power for the D2D transmissions according to a relation stored in its local memory between the allocated resource (UL transmission power determined by UL power control) and initial transmit power (e.g., as in FIG. 5) where the initial transmit power is inherent in the allocated resource. In further embodiments the device sends to the network a requested response to a measurement trigger (which can be a sounding signal that allows the network to measure the BS-UE link itself), and responsive to receiving a subsequent power backup update message the terminal device updates its transmit power over the allocated resource to the another terminal according to the update message.

Above it was noted that these power control techniques can be applied also to mitigate interference from overlay network cells. In an overlay network, there is a miniature network operating within the bounds of the macro network cell and for which the macro cell can exercise some degree of control. A common embodiment of an overlay network is a femto cell within a macro network cell (e.g., UTRAN, LTE or WiMAX cell), in which the femto cell has its own femto BS that is responsive to commands from the macro BS. The macro BS may allocate radio resources to the femto BS and still allocate those same radio resources to UEs in the macro network, since the femto cell generally operates at lesser transmit power to keep its interference potential to a minimum. But since a UE in the femto cell (the femto-UE) is also mobile, interference may result when the femto-UE and the macro-UE get close to one another.

In the femto-cell implementation, the network described above is in the position of the macro network and the macro BS allocates the same radio resources to the macro UE (UE3) and to the femto BS, which stands in the position of UE1 from the above D2D description. If power boosting is used in this overlay network implementation, it is the macro UE that is given the boost command. The D2D interference shown at FIG. 5 is in this implementation interference due to the femto communications between the femto BS and the femto UE. To more generically describe them, the UEs and femto BS can be termed generically as radio nodes, and the D2D or femto link that interferes with the macro link is an underlay network link.

Figure 9:
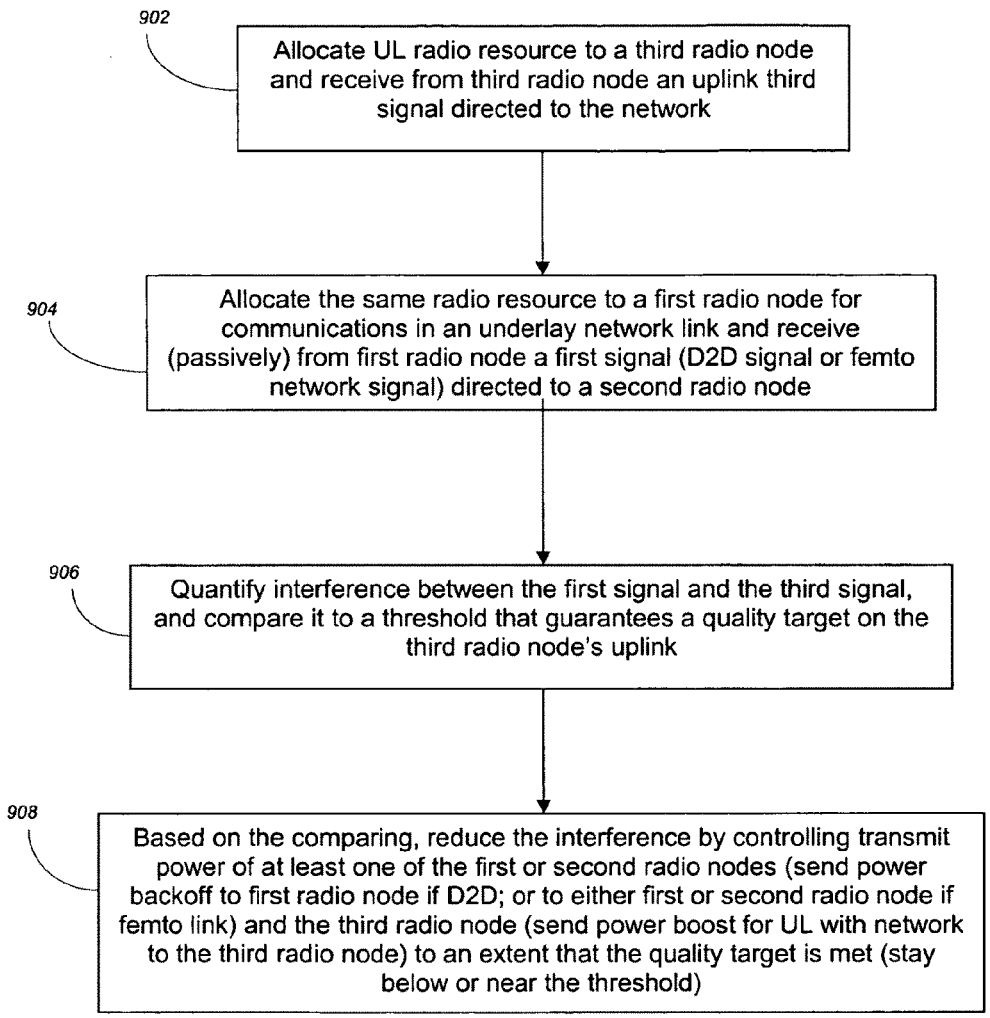
FIG. 9 is a process flow diagram according to an exemplary embodiment of the invention.

Exemplary process steps are shown at FIG. 9. At block 902 the network allocates a radio resource for UL with the network to a third terminal/third radio node, and also receives from the third terminal/radio node a third signal on that UL radio resource where the signal is directed to the network. At block 904 the network (macro BS) allocates to a first radio node the same radio resource for communications with a second radio node, and receives from either the first radio node or the second radio node a first signal sent between the first radio node and the second radio node. In the D2D implementation, the first and second radio nodes are UE1 and UE2 and the first signal is a D2D signal; in the overlay network implementation the first radio node is the femto BS and the second radio node is the femto UE and the first signal is the femto communications between them (i.e., it could be an UL femto signal or a DL femto signal). In either case, this may be a passive reception by the (macro) network BS because this particular signal from the first or second radio nodes is not directed to the macro network but to the other party over the underlay network link (D2D or femto link). In an embodiment the radio resource is a time and frequency resource. Blocks 902 and 904 need not take place in the order shown in FIG. 9. At block 906, using the information from the received signals from blocks 902 and 904, the network computes the power control commands in order that interference between the third terminal/radio node and the first or second radio nodes remains within a threshold, where the threshold assures that a quality target (e.g., BER/BLER/SNR.SINR) on the macro BS-UE link is met. The eventual power boosting and backoff values can be included in the normal power control commands, or else the power control commands can be computed assuming the power boosting and backoff values are signalled explicitly to the terminals. At block 908 the network manages the interference to an extent to meet the quality target by sending power control commands to either the first or second radio nodes or the third terminal/radio node or both. In the femto implementation the BS may send a backoff command to the femto BS. Or if the interfering first signal is an UL femto signal from femto UE to the femto BS, to save time the macro BS can send the backoff command to the femto UE directly (assuming the macro BS knows the DL radio resource being used on the femto network) The backoff value may be indicated either implicitly or explicitly in the power control command to the first or second radio node (the first terminal for its transmissions on the D2D link in that implementation, or the femto BS or femto UE for the femto link in the overlay implementation). The power boosting value may be indicated either implicitly or explicitly in the power control command to the third terminal for its transmissions on the UL to the macro network. These backoff values and/or power boosting values may be signalled with other power control commands for the respective BS-UE links (implicit), or they may be signalled separately from those BS-UE power control messages (explicit). In the overlay implementation, the macro BS may give an explicit indication to the femto BS which then send it implicitly to the femto UE with other normal power control commands (for the case where the interfering first signal is a UL femto signal).

For the aspects of this invention detailed herein by the exemplary embodiments, it should be noted that the various logical step descriptions above and in FIG. 9 as well as in the signaling diagrams of FIGS. 2 and 4 may represent program steps, or interconnected logic circuits of an integrated circuit, blocks and functions, or a combination of program steps and logic circuits, blocks and functions.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs which automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

We claim:

1. A method comprising:
    determining at a base station of a cellular network that a device-to-device communication of a first user equipment on a radio resource with a second user equipment interferes with a communication by a third user equipment on the radio resource with the base station, in which the first user equipment and the second user equipment comprise mobile terminals which use the radio resource for device-to-device communications; and
    managing the interference by the base station controlling transmit power of at least one of the first user equipment, the second user equipment, and the third user equipment, where the base station controls the transmit power based, at least partially, upon at least one measurement received by the base station from the first user equipment, the second user equipment, or the first and second user equipment, where the radio resource is allocated by the base station at least to one of the first user equipment and the second user equipment for communicating to one another via the device-to-device communication and to the third user equipment for communicating by the third user equipment to the base station, wherein controlling the transmit power comprises the base station sending initial power control targets for different bandwidth zones and backoff values to at least one of the first user equipment and the second user equipment, and sending only up/down power control signals to at least one of the first user equipment and the second user equipment for device-to-device transmit power adjustments once a connection between the first and second user equipment is already established, and wherein controlling the transmit power is performed to meet a quality target based on quantified interference between the device-to-device communication and the communication between the third user equipment and the base station.

2. The method according to claim 1, wherein controlling the transmit power comprises sending to at least one of the first user equipment and the second user equipment a power control command that comprises an implicit or explicit backoff value which indicates an amount by which at least one of the first user equipment and the second user equipment is to decrease transmit power for a device-to-device communication.

3. The method according to claim 2, wherein controlling the transmit power further comprises sending to the third user equipment a power control command that comprises an implicit or explicit boost value which indicates an amount by which the third user equipment is to increase transmit power for communicating on the radio resource with the base station.

4. The method according to claim 1, wherein controlling the transmit power further comprises sending to the third user equipment a power control command that comprises an implicit or explicit boost value which indicates an amount by which the third user equipment is to increase transmit power for communicating on the radio resource with the base station.

5. The method according to claim 1, wherein the quality target is for the communication between the third user equipment and the base station, and wherein determining that the device-to-device communication of the first user equipment with the second user equipment interferes with the third user equipment comprises:
    measuring a quality parameter for a signal received from the third user equipment and that is interfered by the first user equipment;
    comparing the measured quality parameter to a threshold that guarantees the quality target between the third user equipment and the base station; and
    for the case that the measured quality parameter does not meet the threshold, computing a transmit power for which the threshold will be met;
    and wherein the transmit power is controlled using the computed transmit power.

6. The method according to claim 1, wherein the quality target is for the communication between the third user equipment and the base station, and wherein determining that the device-to-device communication of the first user equipment with the second user equipment interferes with the third user equipment comprises:
    receiving from the first or second user equipment a measurement report or sounding signal that is triggered by the base station;
    comparing data from the received measurement report or measured from the sounding signal to a threshold that guarantees the quality target between the third user equipment and the base station; and
    for the case that the base station determines from the comparing that the threshold is not met or is being approached for communications between the third user equipment and the base station, then managing the interference by controlling transmit power.

7. An apparatus comprising:
    a non-transitory memory storing computer program instructions, and a processor;
    in which the memory with the computer program instructions is configured with the processor to cause the apparatus to at least:
    determine at a base station of a cellular network that a device-to-device communication of a first user equipment on a radio resource with a second user equipment interferes with a communication by a third user equipment on the radio resource with the base station, in which the first user equipment and the second user equipment comprise mobile terminals which use the radio resource for device-to-device communications; and
    manage the interference by the base station controlling transmit power of at least one of the first user equipment, the second user equipment, and the third user equipment, where the base station controls the transmit power based, at least partially, upon at least one measurement received by the base station from the first user equipment, the second user equipment, or both the first and second user equipment,
    where the memory with the computer program instructions is configured with the processor to cause the apparatus to allocate the radio resource to the third user equipment for communicating with the base station, and to allocate by the base station the radio resource at least to one of the first user equipment and the second user equipment for communicating with one another via the device-to-device communication and to the third user equipment for communicating by the third user equipment to the base station, wherein controlling the transmit power comprises the base station sending initial power control targets for different bandwidth zones and backoff values to at least one of the first user equipment and the second user equipment, and sending only up/down power control signals to at least one of the first user equipment and the second user equipment for device-to-device transmit power adjustments once a connection between the first and second user equipment is already established, and wherein controlling the transmit power is performed to meet a quality target based on quantified interference between the device-to-device communication and the communication between the third user equipment and the base station.

8. The apparatus according to claim 7, wherein the memory with the computer program instructions is configured with the processor to control the transmit power by sending to at least one of the first user equipment and the second user equipment a power control command that comprises an implicit or explicit backoff value which indicates an amount by which at least one of the first user equipment and the second user equipment is to decrease transmit power for a device-to-device communication.

9. The apparatus according to claim 8, wherein the memory with the computer program instructions is configured with the processor to further control the transmit power by sending to the third user equipment a power control command that comprises an implicit or explicit boost value which indicates an amount by which the third user equipment is to increase transmit power for communicating on the radio resource with the base station.

10. The apparatus according to claim 7, wherein the memory with the computer program instructions is configured with the processor to further control the transmit power by sending to the third user equipment a power control command that comprises an implicit or explicit boost value which indicates an amount by which the third user equipment is to increase transmit power for communicating on the radio resource with the base station.

11. The apparatus according to claim 7, wherein the quality target is for the communication between the third user equipment and the base station, and wherein the memory with the computer program instructions is configured with the processor to determine that the device-to-device communication of the first user equipment with the second user equipment interferes with the third user equipment by:
measuring a quality parameter for a signal received at the apparatus from the third user equipment and that is interfered by the first user equipment;
comparing the measured quality parameter to a threshold, stored in the memory, that guarantees the quality target between the third user equipment and the base station; and
for the case that the measured quality parameter does not meet the threshold, the memory with the computer program instructions is configured with the processor to compute a transmit power for which the threshold will be met;
and wherein the memory with the computer program instructions is configured with the processor to cause the apparatus to control the transmit power using the computed transmit power.

12. The apparatus according to claim 7, wherein the quality target is for the communication between the third user equipment and the base station, and wherein the memory with the computer program instructions is configured with the processor to determine that the communication of the first user equipment with the second user equipment interferes with the third user equipment by:
receiving from the first or second user equipment a measurement report or a sounding signal that is triggered by the base station;
comparing data from the received measurement report or measured from the sounding signal to a threshold stored in the memory that guarantees the quality target between the third user equipment and the base station; and
for the case that the processor determines from the comparing that the threshold is not met or is being approached for communications between the third user equipment and the base station, then the memory with the computer program instructions is configured with the processor to cause the apparatus to manage the interference by controlling transmit power.

13. The method according to claim 1, wherein the at least one measurement received by the base station from the first user equipment, the second user equipment, or the first and second user equipment comprises signal power measured at corresponding ones of the first user equipment, the second user equipment, or the first and second user equipment.

14. The method according to claim 1, wherein the at least one measurement received by the base station from the first user equipment, the second user equipment, or the first and second user equipment comprises pathloss measured at corresponding ones of the first user equipment, the second user equipment, or the first and second user equipment.

15. The method according to claim 1, wherein the at least one measurement received by the base station from the first user equipment, the second user equipment, or the first and second user equipment comprises signal power and pathloss measured at corresponding ones of the first user equipment, the second user equipment, or the first and second user equipment.

16. The method according to claim 2, wherein sending comprises sending to at least one of the first user equipment and the second user equipment a power control command that comprises an explicit backoff value which indicates an amount by which at least one of the first user equipment and the second user equipment is to decrease transmit power for a device-to-device communication.

17. The method according to claim 2, wherein the base station specifies the backoff value depending on quality of service of cellular traffic for the third user equipment.

* * * * *